(12) United States Patent
Rosay et al.

(10) Patent No.: US 8,855,703 B2
(45) Date of Patent: *Oct. 7, 2014

(54) METHOD OF DRIVING A MOBILE COMMUNICATION TERMINAL

(71) Applicant: Ericsson Modems SA, Geneva (CH)

(72) Inventors: Arnaud Rosay, Voivres les le Mans (FR); Samuel Lamazure, Moutiers (FR)

(73) Assignee: Ericsson Modems SA, Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/137,301

(22) Filed: Dec. 20, 2013

(65) Prior Publication Data

US 2014/0113654 A1   Apr. 24, 2014

Related U.S. Application Data

(63) Continuation of application No. 12/665,300, filed on Jun. 11, 2010, now Pat. No. 8,630,674.

(30) Foreign Application Priority Data

Jun. 27, 2007 (EP) ..................................... 07111141

(51) Int. Cl.
*H04B 7/00* (2006.01)
*H04W 52/02* (2009.01)
*H04W 24/10* (2009.01)
*H04W 36/08* (2009.01)
*H04W 68/00* (2009.01)

(52) U.S. Cl.
CPC ...... *H04W 52/0254* (2013.01); *H04W 52/0229* (2013.01); *H04W 24/10* (2013.01); *H04W 52/0216* (2013.01); *H04W 36/08* (2013.01); *Y02B 60/50* (2013.01); *H04W 68/00* (2013.01)
USPC ........ 455/522; 455/456.4; 455/457; 455/526; 455/423; 455/67.11; 342/387; 342/465

(58) Field of Classification Search
USPC ................... 455/456.1, 457, 526, 423, 67.11; 342/387, 465
See application file for complete search history.

(56) References Cited

U.S. PATENT DOCUMENTS 6,067,460 A * 5/2000 Alanara et al. ................ 455/574
6,144,858 A 11/2000 Masuda
(Continued)

FOREIGN PATENT DOCUMENTS

EP  0812119 A2  12/1997
EP  1729530 A2  12/2006
(Continued)

OTHER PUBLICATIONS

PCT International Search Report, PCT/IB2008/052449, mailing date Nov. 25, 2008, pp. 3.

*Primary Examiner* — Bobbak Safaipour
(74) *Attorney, Agent, or Firm* — Peter J. Meza; Hogan Lovells US LLP

(57) ABSTRACT

A method of driving a mobile communication terminal in a cellular network, includes monitoring with a control unit of the mobile communications terminal, reception power levels between the mobile communication terminal and cellular network base stations at a predefined monitoring rate for each base station. Timing information values for a number of base stations are intermittently monitored by the control unit. Drift of the timing information values for at least two of the base stations is monitored and significant motion of the mobile communication terminal is deemed detected if at least one of the timing information values indicates a drift equal to or exceeding a given timing drift threshold. The predefined reception power level monitoring rate is reduced to a reduced reception power level monitoring rate for at least a number of the base stations as long as the motion of the mobile communication terminal is not significant.

17 Claims, 6 Drawing Sheets

(56) References Cited

U.S. PATENT DOCUMENTS

| | | | |
|---|---|---|---|
| 6,292,660 B1 | 9/2001 | Hartless et al. | |
| 6,363,267 B1* | 3/2002 | Lindskog et al. | 455/574 |
| 6,529,165 B1 | 3/2003 | Duffett-Smith et al. | |
| 6,671,660 B2* | 12/2003 | Freed | 702/188 |
| 6,708,041 B1* | 3/2004 | Butovitsch et al. | 455/522 |
| 7,136,680 B2* | 11/2006 | Leizerovich et al. | 455/574 |
| 7,359,719 B1 | 4/2008 | Duffett-Smith et al. | |
| 7,362,531 B2* | 4/2008 | Kim | 360/69 |
| 8,041,403 B2 | 10/2011 | Almalki | 455/574 |
| 2002/0147024 A1* | 10/2002 | Wan | 455/515 |
| 2002/0177476 A1* | 11/2002 | Chou | 455/574 |
| 2004/0187044 A1* | 9/2004 | Barman et al. | 713/400 |
| 2004/0192347 A1* | 9/2004 | Leizerovich et al. | 455/456.1 |
| 2005/0208946 A1* | 9/2005 | Kahana | 455/442 |
| 2006/0029031 A1* | 2/2006 | Koorapaty | 370/350 |
| 2008/0285477 A1* | 11/2008 | Kuroda et al. | 370/252 |
| 2009/0209271 A1* | 8/2009 | Reed et al. | 455/456.6 |
| 2009/0224876 A1* | 9/2009 | McCall et al. | 340/5.61 |

FOREIGN PATENT DOCUMENTS

| | | | |
|---|---|---|---|
| WO | 2005115040 A1 | 12/2005 | |
| WO | WO 2005115040 A1 * | 12/2005 | H04Q 7/38 |

* cited by examiner

METHOD OF DRIVING A MOBILE COMMUNICATION TERMINAL

CROSS-REFERENCE TO RELATED APPLICATIONS

The present application is a Continuation of and claims the benefit of U.S. patent application Ser. No. 12/665,300, 371© date Jun. 11, 2010, which claims the benefit of national filing in the U.S. Patent & Trademark Office of PCT/IB2008/052449 filed Jun. 20, 2008, and claims priority of European Patent Application No. 07111141.3 filed Jun. 27, 2007, all of which applications are incorporated herein in their entireties by this reference.

FIELD OF THE INVENTION

The invention relates to a method of driving a mobile communication terminal in a cellular network, in which reception power levels between the mobile communication terminal and a number of base stations of the cellular network are monitored by a control unit of the mobile communication terminal at a predefined reception power level monitoring rate for each base station. The invention also relates to a mobile communication terminal for use in a cellular network with a control unit comprising a reception power monitoring unit, which monitors reception power levels between the mobile communication terminal and a number of base stations of the cellular network at a predefined reception power level monitoring rate for each base station, and to such a control unit for use in a mobile communication terminal.

BACKGROUND OF THE INVENTION

In cellular mobile radio communication systems, the mobile communication terminal, often just called "mobile terminal", "mobile station" or "user equipment", must monitor reception power levels at regular rates for all of the cells in the neighbourhood, and report the measured reception power levels to the respective base stations during a call, so that the cell most suitable for a high quality transmission can be determined. In call mode, cell changes are called 'handover', and it is the network that decides which cell to select on the basis of the measurements reported to the network by the mobile terminal. In idle mode (when there is no call), no measurement reports are sent to the base stations and the mobile terminal itself is responsible for cell re-selection, i.e. the mobile terminal determines which is the most suitable cell to 'camp on'. These power level measurement rates are specified by the cellular network specification, for example by the 3GPP Standard. The monitoring rates may be different for different base stations. For example, the monitoring rate of the selected or serving cell base station, which currently serves the mobile station, can be different from the monitoring rates of the adjacent cell base stations. A detail description of cell re-selection based on the monitoring information is available in 3GPP TS 45.008.

Also, when the mobile station is in idle mode, meaning that it is connected to the cellular network but that there is no ongoing call, several measurements are performed every few seconds. For example, in GSM (Global System for Mobile communications) idle mode there are seven monitorings of the reception level per paging block for each base station of up to 32 neighbouring cells. The period of paging block reading could be programmed from 0.47 seconds to 2.12 seconds. Up to five measurements must be done per neighbouring cell within the limit of a maximum rate period of five seconds to obtain an average reception power level per cell. For instance, in case of ten neighbouring cells, the measurement period for all of the cells will be approximately four seconds, with a paging period of 0.47 seconds. In non-moving mode, when the mobile terminal is essentially stationary, these power levels will not vary significantly. In GPRS (General Packet Radio Service) idle mode there are sixteen monitorings per paging block, so that in this standard the monitoring rate is much higher then in GSM-systems. These monitorings are useful for re-selection of a new cell, but the measurements are superfluous when the mobile station is not moving, for example, when the user is in his office or at home. In such situations, this monitoring is effectively a waste of power consumption which significantly decreases the autonomy of the mobile station, i.e. the duration of time the mobile station can operate without having to recharge the batteries.

An attempt to reduce power consumed in the reception level measurement is disclosed in EP1 130 937 A1. In this document, it is proposed to determine the current location of a mobile station by using the measured reception power levels for localisation of the mobile terminal in the network and to determine whether the mobile station is near the centre of the serving cell. Should that be the case, the measurement and reporting of the reception power levels to the respective base stations is suspended for all adjacent base stations. A drawback of this method is that it only works when the mobile station is near the base station of the serving cell, but does not work in situations where the mobile station is stationary but located in an intermediate zone between two or three base stations.

SUMMARY OF THE INVENTION

It is an object of the invention to provide an alternative method of reducing power consumption of a mobile communication terminal by reducing the reception power level measuring rate.

To this end, the present invention provides a method of driving a mobile communication terminal in a cellular network, in which method
   reception power levels between the mobile communication terminal and a number of base stations of the cellular network are monitored by a control unit of the mobile communication terminal at a predefined reception power level monitoring rate for each base station.
   timing information values for a number of base stations of the cellular network are intermittently monitored by a control unit of the mobile communication terminal, e.g. at recurrent intervals according to a given timing information monitoring rate for each base station,
   a drift of the timing information values for at least two of the base stations is monitored and a significant motion, or change in location, of the mobile communication terminal is detected if at least one of the timing information values indicates a drift equal to or exceeding a given timing drift threshold
   and the desired reception power level monitoring rate is reduced to a reduced reception power level monitoring rate for at least a number of the base stations as long as the motion of the mobile communication terminal is not significant.

In cellular systems using, for example, TDMA (Time Division Multiple Access) schemes, a burst of information must be transmitted in a specified timing window or so-called "slot". The propagation time of the signals and therefore the time of arrival of the bursts at the receiver depend on the distance between a transmitter and receiver. For this reason, mobile stations must continually monitor timing information values for the base stations, which timing information values reflect a signal propagation time between the mobile terminal and the respective base station. For mobility management reasons, the mobile station must monitor the timing information values not only of the serving cell, but also of the neighbouring cells (up to 6 near cells and up to 26 remote cells). The usual timing information value in TDMA-systems like GSM or GPRS is the so called TOI (Timing Offset Information) which represents the time base error in quarter bit units between the mobile station and the base station. Using this TOI, the mobile device may be synchronised to the serving base station and to some of the adjacent base stations in order to allow cell re-selection or fast handover between two base stations (when the mobile station moves from one cell to a neighbouring cell).

Since the timing information values depend on the signal propagation time between the respective base stations and the mobile station, they also reflect the movement of the mobile station. As long as none of the timing information values for the different base stations shows a significant drift, one can assume that there is no significant motion or change in location of the mobile station. In such a situation, it can be assumed that there will be no fast change in reception power levels. The reception power level monitoring rate can then be reduced without any adverse effect on the operational capability of the mobile station. Therefore, a mobile communication terminal utilising such a method may consume less power, which is of particular advantage in the case of a mobile device powered by a rechargeable battery because the autonomous stand-by time (without recharging) of such a device may be significantly increased.

A suitable control unit for use in a mobile communication terminal of a cellular network comprises a reception power monitoring unit for monitoring the reception power levels between the mobile communication terminal and a number of base stations of the cellular network, which monitoring is carried out at a predefined reception power level monitoring rate for each base station. The control unit further comprises a timing information monitoring unit for intermittently monitoring timing information values for a number of base stations of the cellular network. To this end, the control unit according to the invention is realised such that a drift of the timing information values for at least two of the base stations is monitored and a significant motion of the mobile communication terminal is detected if at least one of the timing information values indicates a drift equal to or exceeding a given timing drift threshold, and such that the desired reception power level monitoring rate is reduced to a reduced reception power level monitoring rate for at least a number of the base stations as long as the motion of the mobile communication terminal is not significant.

A mobile communication terminal for use in a cellular network according to the invention comprises an antenna, a known type of receiver unit coupled to this antenna, a known type of transmitter unit coupled to this antenna, and a control unit according to the invention.

Generally, the above mentioned steps of the method of driving a mobile communication terminal might be realised in the form of a suitable computer program product for running at some level in a programmable control unit of the mobile terminal. Such a computer program product can be one or more software modules which can be loaded into the memory of the programmable control unit. Existing mobile terminals, as pointed out above, already make use of a reception power monitoring unit and a timing information monitoring unit, so that these can easily be upgraded with a suitable software-update.

The dependent claims and the subsequent description disclose particularly advantageous embodiments and features of the invention. Further developments of the apparatus claim in keeping with the dependent method claims also lie within the scope of the invention.

In a preferred embodiment, a drift of reception power levels for at least a number of the base station is also monitored and a significant motion of the mobile communication terminal is detected if at least one of the reception power levels shows a drift equal to or exceeding a given power drift threshold. In the known standards, the period of measurement and the rate of variation of the sampling of the timing information values and the reception power levels are not the same. The periods of the reception power levels are normally shorter than the periods of the sampling of the timing information values. Moreover, the periods are completely asynchronous. Using the drift of the reception power levels as an additional indicator of significant motion of the mobile station may reinforce the process, so that the process will react better in case of a transition from a non-moving state to a moving state of the mobile station.

As explained above, the mobile station must report the current reception power level for each base station to the respective base stations, as laid down precisely in the standards. The base stations wait for messages from the mobile communication devices currently registered in the network reporting the current reception power levels. To avoid necessitating a change in the standards, the reporting of the reception power level can, in a preferred embodiment of the method, be carried out at the usual rate even when the mobile station is stationary. Therefore, if the reception power levels are monitored at the reduced reception power level monitoring rate, a previously measured reception power level is preferably reported to the base station until a new reception power level has been measured. Since it can be expected that changes in the reception power level only occur slowly or not at all while the mobile communication device is stationary, the previously measured reception power level can safely be sent repeatedly, since this power level will in all probability not be any different from the actual power level. To this end, it suffices to store the last measured reception power level for the reporting and to repeatedly send this value until this value is overwritten by a new measurement value. As soon as the mobile station is once again in motion, the reception power level monitoring rate will, according to the invention, be immediately increased once again to the standard value, and the current values will then be transmitted to the base stations. Since reporting the reception power levels also requires some energy, the saving in energy is not as great as it would be if the reporting rate were also to be reduced. However, an alteration of the standards is not without effort and cost, so that this method is the simpler solution. Specifically, devices that are capable of carrying out the method according to the invention can readily be provided, so that a significant amount of energy can be saved.

Any time-related data that are dependent on or derived from values that indicate motion of the mobile terminal—for instance, the propagation time between the mobile terminal and the respective base stations—can be used as timing information values. Preferably, the timing information values comprise a timing offset indication which must be monitored in any case in order to synchronise the time base of the mobile equipment to the base station.

Basically, all reception power level monitoring rates for all base stations may be reduced if the mobile terminal is not moving. In one embodiment of the invention, only the reception power level monitoring rates for base stations of adjacent cells are reduced to the reduced reception power level monitoring. In other words, the reception power level monitoring rate for the current serving cell remains unchanged in order to ensure that the device reacts as quickly as possible in the event of a sudden decrease in reception power for a reason other than a motion of the mobile station. This has the additional advantage that the activities of the cellular network on the serving cell are not adversely affected, ensuring that the recommendations are adhered to. Equally, it is also possible to individually define the amount by which the power level monitoring rate for each base station is to be reduced in a stationary or near stationary state of the mobile station. In this way, for example, the power level monitoring rate for closely neighbouring cells or cells to which the mobile station has synchronised itself for a possible handover can be reduced by less than the rate for cells that are further away or cells that are not synchronised.

BRIEF DESCRIPTION OF THE DRAWINGS

Other objects and features of the present invention will become apparent from the following detailed descriptions considered in conjunction with the accompanying drawing. It is to be understood, however, that the drawings are designed solely for the purposes of illustration and not as a definition of the limits of the invention.

DETAILED DESCRIPTION OF PREFERRED EMBODIMENTS

In the diagrams, like numbers refer to like objects throughout.

Figure 1:
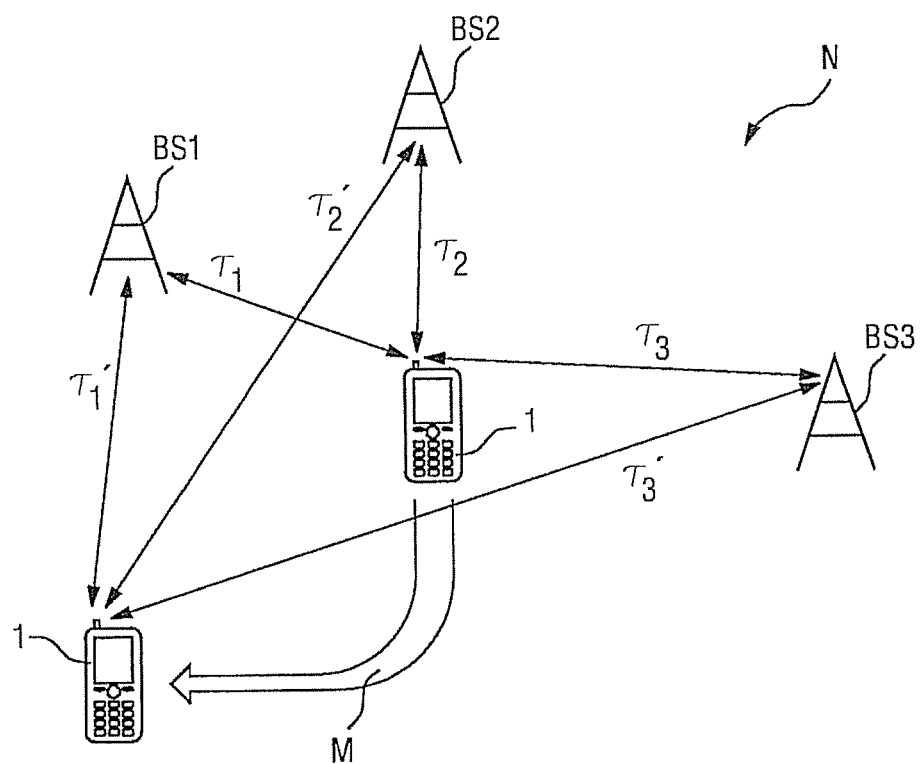
FIG. 1 is a schematic representation of the change in propagation times between a mobile communication terminal and three base stations in a cellular network.

FIG. 1 shows a mobile station 1 which is in motion in a cellular network N. The motion M is indicated with an arrow. The cellular network N, as is usual, comprises a number of base stations BS1, BS2, BS3, each of which can serve mobile stations located within its own cell, where the cell is defined by the reception or transmission radius of the corresponding base station BS1, BS2, BS3. For the sake of clarity, only three base stations BS1, BS2, BS3 are shown in the diagram.

A certain propagation time $\tau_1, \tau_2, \tau_3$ is given between each base station BS1, BS2, BS3 and the mobile station 1, which propagation time depends, among others, on the distance between the mobile station 1 and the corresponding base station BS1, BS2, BS3. Evidently, the propagation times $\tau_1, \tau_2, \tau_3$ of the base stations BS1, BS2, BS3 can change when the mobile station 1 moves, as shown here by the direction of motion M. In this example, the propagation time of the first base station BS1 is reduced, while the propagation times $\tau_2'$, $\tau_3'$ of the second base station BS2 and the third base station BS3 actually increase. Such a change in position generally results in a change in reception power levels. It will be stressed at this point, however, that the reception power levels and the propagation times $\tau_1, \tau_2, \tau_3$ are not solely dependent on the separation of the mobile terminal 1 from the base stations BS1, BS2, BS3, but also depend on other factors, such as buildings in the path of transmission, landscape contours, etc. However, motion of the mobile station 1 does generally result in a change in the propagation times $\tau_1, \tau_2, \tau_3$ as well as a change in the reception power levels.

Figure 2:
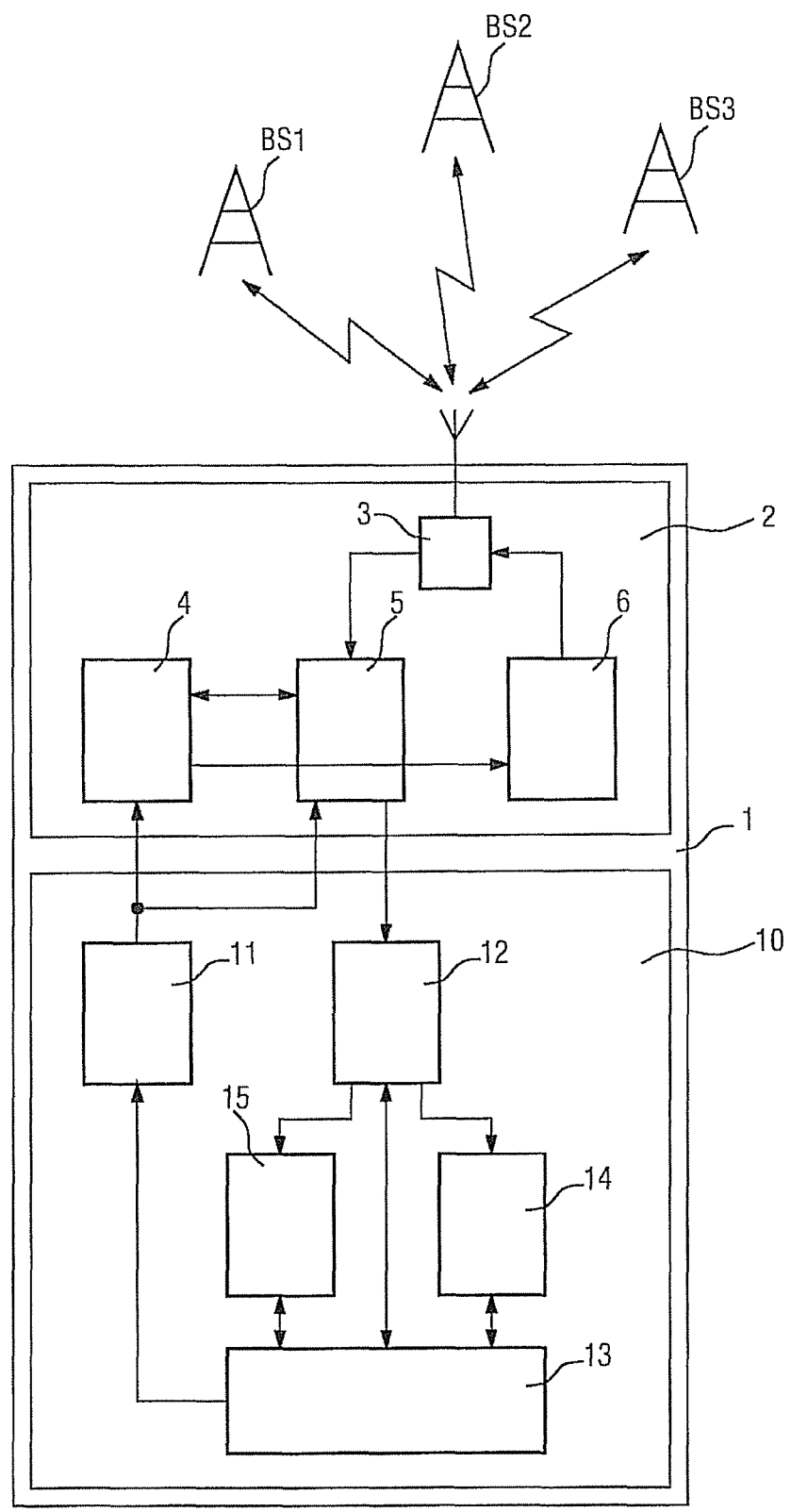
FIG. 2 is a block diagram showing the construction of a mobile communication terminal according to one embodiment of the invention.

FIG. 2 shows an embodiment of a mobile station 1 according to the invention, with the usual radio unit 2 and a control unit 10. The radio unit 2 serves to receive and transmit signals. The control unit 10 serves to demodulate and decode the received signals and also to control the radio unit 2.

The radio unit 2 comprise the usual receive/transmit antenna 3, a reception unit 5, a transmission unit 6 and a synthesizer 4. The signals received by the reception unit 5 are forwarded to a demodulation-/decoding unit 12 of the control unit 10. The reception unit 5 and the synthesizer 4 are controlled by a radio control unit 11 of the control unit 10. The mobile terminal 1 according to the invention also requires a timing information monitoring unit 15, also referred to as time base error processing unit 15, and a reception power monitoring unit 14. All components of the control unit 10 are controlled by a central processing unit 13 (CPU). With the exception of the method according to the invention for the detection of the motion state of the mobile terminal 1, the reduction in reception power monitoring rate, and the dedicated reporting, the realisation and interrelationship of the components in a mobile terminals 1 will be known to a person skilled in the art and need not therefore be described in any detail here. The reception power monitoring unit 14 and the timing information monitoring unit 15 could also be integrated in the CPU 13.

Figure 3:
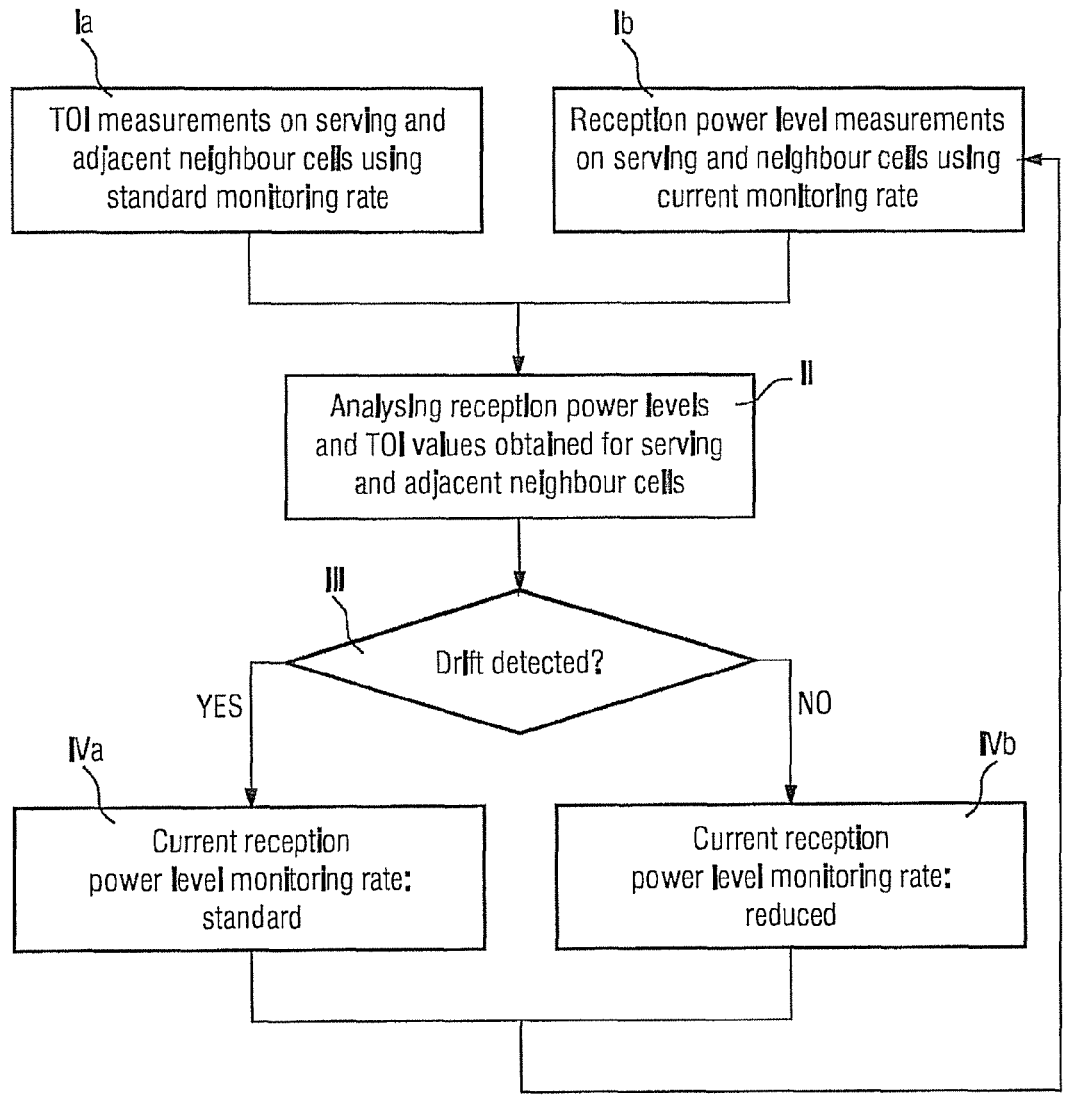
FIG. 3 is a flow chart showing an algorithm of a process for controlling the reception level measurement according to one embodiment of the invention.

The reception power monitoring unit 14, the timing information monitoring unit 15 and the CPU 13 can be, equipped with suitable software modules so that the reception power level measurements can be carried out according to the example flowchart shown in FIG. 3.

In step Ia of FIG. 3, so-called TOI measurements are continually performed for the serving cell and the adjacent neighbouring cells to which the mobile terminal is currently synchronised. Variations of the TOI values are implied, for example, by variations of the propagation times $\tau_1, \tau_2, \tau_3$. There is a direct relationship between the propagation times and the TOI parameters. The rate at which these TOI measurements are carried out is specified by the applicable mobile telephony standard of the mobile communications network.

In the example that is described with the aid of the diagrams, it is assumed that the timing information values comprise a timing offset indication TOI, without limiting the invention in any way.

The initial TOI may be obtained for each base station during the initial synchronization of the serving cell and the neighbouring cells. In a first step, the mobile station searches for the so called "frequency burst" over a wide reception window. Once the frequency burst is found, the mobile station can determine the initial FOI (Frequency Offset Information) and the initial TOI. The time base of the mobile terminal is then synchronised according to the TOI value of the serving cell. The TOIs of the neighbouring cells, relative to the serving cell time base synchronization, are stored by the mobile terminal in order to allow a fast synchronization to the new serving cell in case of a cell re-selection or a handover (change between two base stations). In a second step, the mobile terminal reads the so-called "synchronization burst". The frame position of the synchronization burst relative to the frequency burst is clearly specified in the GSM standard of the cellular system. Once the cell is synchronised, the mobile terminal reads the normal bursts of the system information of the serving cell, the paging blocks and other information blocks according to the idle mode configuration. The TOI synchronization is maintained according to these normal burst readings. The mobile terminal timebase is adjusted according to the TOI value. The accumulated TOI of the serving cell is use to detect drift, as will be explained later in detail. The mobile terminal periodically reads the synchronizing burst for neighbouring cells to which the mobile terminal is synchronised, in order to check whether the synchronization is maintained. The mobile terminal also periodically reads the normal burst of the system information block for re-selection purposes. These activities, carried out on the neighbouring cells, define the rates of their TOI measurements.

The exact TOI measuring rate or TOI measurement period depends on the period of paging blocks reading. In GSM idle, the period for the serving cell may vary between 0.47 s and 2.12 s. In GPRS idle this period may vary between 0.04 s and 15.36 s. These parameters are defined, for example, in the 3GPP TS 45.002 recommendation.

The mobile station has to check the synchronization every 30 s for the synchronised neighbour cells in GSM idle. In GPRS idle, the synchronization of the neighbouring cells is checked every 10 s.

Furthermore, the reception power level measurements for the serving cell and the neighbouring cells are regularly carried out in step Ib, independently of whether or not the mobile terminal is currently synchronised to the neighbouring cells. These reception power level measurements are performed at a certain rate defined by the mobile communication system standard. As can be seen from FIG. 3, this reception power level measurement rate may be reduced under certain conditions according to the invention.

Therefore, in step II, the reception power levels and TOI values, obtained for the selected and adjacent neighbouring cells to which the mobile station is synchronised, are examined to determine whether they reveal any drift equal to or exceeding a given drift threshold. Both an increase and decrease in drift can be taken into consideration, i.e. the threshold for the reception power level and the threshold for the timing information values, or the TOI threshold, each define a range within which the current reception power levels or current TOI values are permitted to deviate.

To avoid the situation in which a single deviation value is erroneously interpreted as indicating a motion of the mobile station, the measured timing information values or TOI-values and the measured reception power levels are preferably first filtered. This might involve, for example, calculation of a type of floating mean value which is then ultimately used to determine whether or not the drift in the relevant value lies within the specified range.

Figure 4:
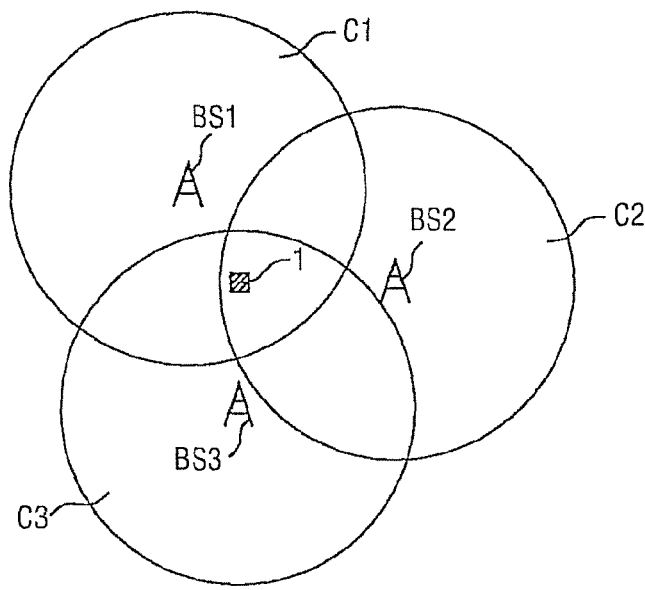
FIG. 4 is a schematic view of a mobile station which is in a stationary mode or slow speed mode in an intermediate zone between three base stations.
Figure 5:
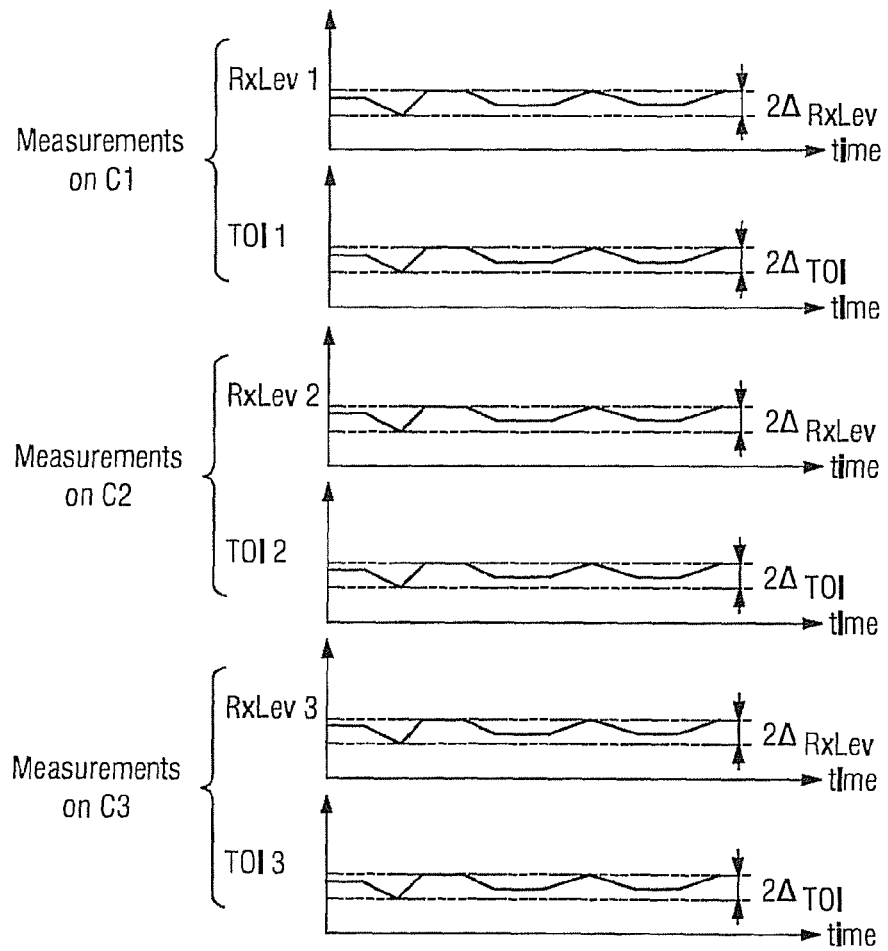
FIG. 5 is a graph showing the reception power levels and the timing offset indication values measured by the mobile station in a situation according to FIG. 4.
Figure 6:
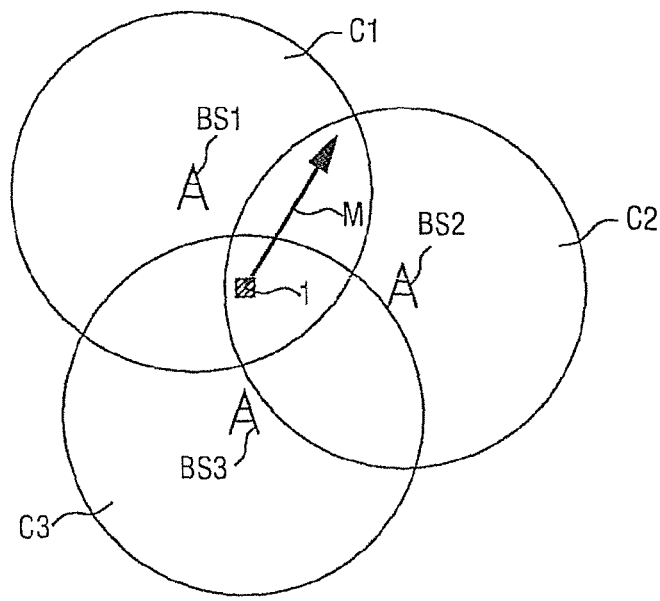
FIG. 6 is a schematic view of a mobile station which is in a straightaway moving mode in an intermediate zone between three base stations.
Figure 7:
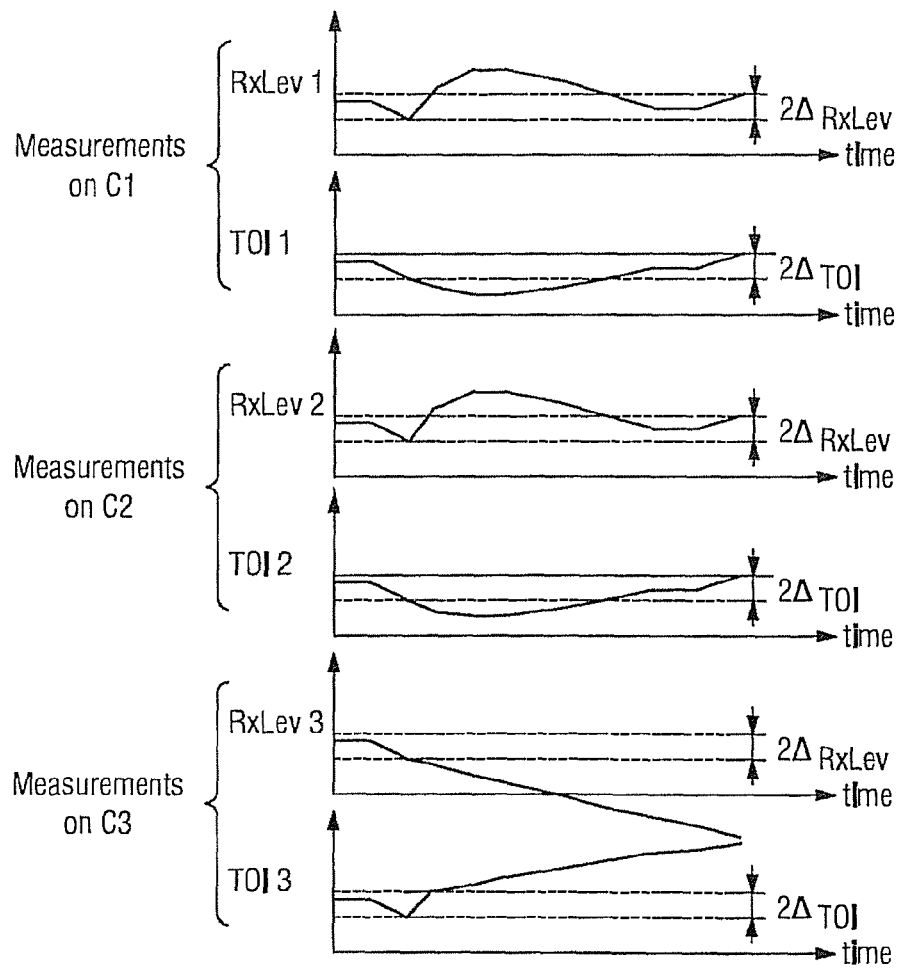
FIG. 7 is a graph showing the reception power levels and the timing offset indication values measured by the mobile station in a situation according to FIG. 6.
Figure 8:
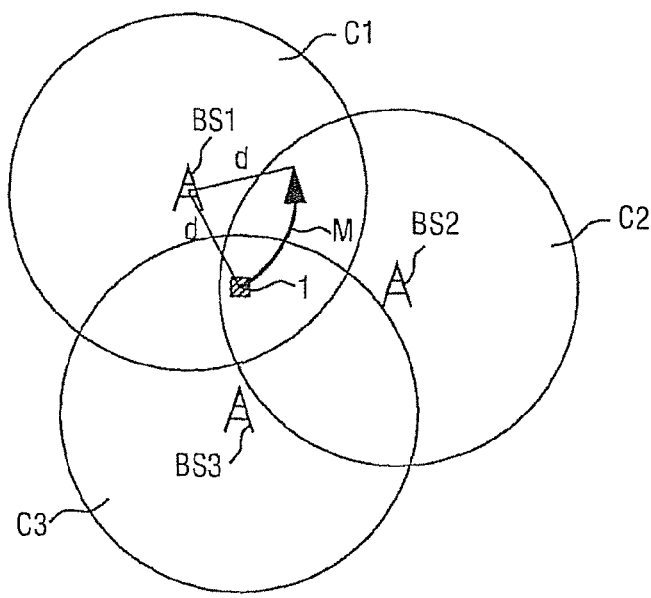
FIG. 8 is a schematic view of a mobile station which is in a circular moving mode in an intermediate zone between three base stations.
Figure 9:
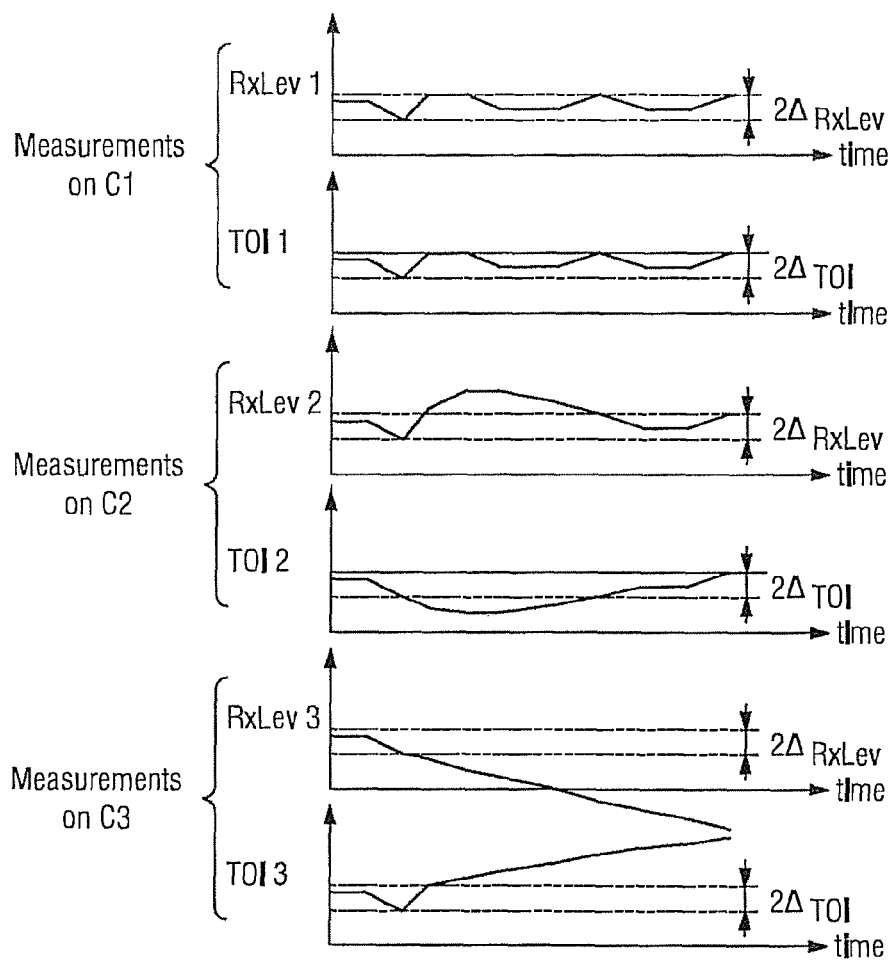
FIG. 9 is a graph showing the reception power levels and the timing offset indication values measured by the mobile station in a situation according to FIG. 8.

FIGS. 4, 6 and 8 are schematic representations of three different mobility situations in the network N, in which the mobile station 1 might find itself. FIGS. 5, 7 and 9 show examples of measured reception power levels and TOI values that might be measured in each of the corresponding situations.

FIG. 4 shows the mobile station 1 in a stationary or slow speed status. This diagram also shows the cells C1, C2, C3 covered by the corresponding base stations BS1, BS2, BS3. The mobile station 1 is in an area overlapped by all three cells C1, C2, C3 (in the diagram, the cells C1, C2, C3 are shown to be circular, but this is in reality not necessarily the case, since the range of a base station may not be the same in all directions and is determined, among others, by buildings and landscape profile). In the situation shown here, all timing information values or TOI values, and all reception power level values, should remain within the specified range, i.e. there should be no significant drift.

FIG. 5 shows the reception power levels RxLev1, RxLev2, RxLev3 and TOI values TOI1, TOI2, TOI3 measured over time by the mobile station 1 for each of the three base stations BS1, BS2, BS3 in the corresponding cells C1, C2, C3.

Each of the graphs also shows a deviation range, bounded by upper and lower threshold values, within which the corresponding value can move without resulting in a significant drift being noted. For the reception power levels RxLev1, RxLev2, RxLev3, the deviation range has a 'height' of $2 \cdot \Delta_{RxLev}$, i.e. the reception power level RxLev1, RxLev2, RxLev3 may deviate from a mean value by $\pm \Delta_{RxLev}$. In the same manner, the permitted range of deviation for the TOI values TOI1, TOI2, TOI3 is shown in this example to have a 'height' of $2 \cdot \Delta_{TOI}$, i.e. the TOI value may deviate from a mean value by $\pm \Delta_{TOI}$. The permitted deviation range and/or the mean value are obtained from a more long-term averaging of the corresponding reception power levels RxLev1, RxLev2, RxLev3 and timing information or TOI values TOI1, TOI2, TOI3, and is correspondingly adjusted to reflect long-term changes, since it is only the drift that should be determined, whereas the absolute values are indeed relatively unimportant. As can be seen in FIG. 5, the reception power levels RxLev1, RxLev2, RxLev3 and the TOI values TOI1, TOI2, TOI3 for all three base stations BS1, BS2, BS3 change very slowly in value within the given upper and lower thresholds, since the mobile terminal 1 is in a slow speed state.

A different situation is shown in FIG. 6. Here, the mobile station 1 undergoes a motion in a straight line in a direction M away from the base station BS3 of the cell C3, and between two other base stations BS1, BS2. This leads to considerable deviations in the measurements of the reception power levels RxLev1, RxLev2, RxLev3 and the timing information values TOI1, TOI2, TOI3 for all three base stations BS1, BS2, BS3, as shown in FIG. 7, so that thresholds are surpassed. Evidently, using these measurements, it is quite easy to determine that the mobile station 1 is in motion.

FIG. 8 shows a situation in which the mobile station 1 is following a circular motion M about the base station BS 1 in the serving cell C1, i.e. the distance between the base station BS 1 and the mobile station 1 remains essentially constant. This is reflected in the measurements shown in FIG. 9. Here, the reception power levels RxLev1 and the timing information values TOI1 measured by the mobile station 1, for base station BS1, remain within the specified deviation range. However, the reception power levels RxLev2, RxLev3 and the timing information values TOI2, TOI3 for the other two base stations BS2, BS3 exhibit a drift that results in the permitted threshold being transcended. A motion of the mobile station 1 can therefore also be detected with these measurements. This situation also clearly demonstrates the advantage of monitoring the timing information values TOI1, TOI2, TOI3 of several base stations BS1, BS2, BS3 according to the invention, since, for certain kinds of motion, it might be that the values of a single base station remain within the threshold limits (as was the case in this example for base station BS1), even though the mobile station is undergoing a significant motion.

Returning to FIG. 3—based on the analysis carried out in step II, a decision is made in step III as to whether or not a significant drift can be determined in the measurement values for one of the base stations BS1, BS2, BS3. Should this be the case, step IVa specifies that the standard reception power level measurement rate is to be maintained, for both the serving cell and the neighbouring cells. If step III determines that no significant drift has been detected, it can be assumed that the mobile station 1 is essentially stationary, or is moving only very slowly, so that a situation such as that described in FIG. 4 can be assumed. In this case, the reception power level measurement rate is reduced, whereby this can be done for the selected cell as well as for the neighbouring cells, and the rates of the selected cell and the neighbouring cells can be reduced by different amounts.

Using the reception power level monitoring rate specified in steps IVa, IVb, the process flow returns to step Ia, reception power level measurements for the serving cell and the neighbouring cells are preformed, and steps I to IV are repeatedly carried out to determine whether the mobile station 1 is still stationary.

The method according to the invention makes it possible to reduce the monitoring of the reception power level, for example in GSM idle mode, from seven measurements per paging block to one, two, three or four measurements. In other words, the monitoring rate can be reduced by a value of between about 42% to about 85% of the standard monitoring rate depending on the current situation. In GPRS idle, where sixteen monitorings are usually performed per paging block, the monitoring rate can even be reduced by a value of between about 75% to about 93% of the standard monitoring rate Therefore, in certain transmission modes, for example in GSM idle mode with a synchronised neighbouring cell, a 800 mAh battery can achieve an increase of 40 additional hours of standby time. In GPRS idle mode with sixteen synchronised neighbouring cells and an appropriate battery, up to 80 hours of additional standby time can be gained.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. A "unit" or "module" can comprises a number of units or modules, unless otherwise stated.

The invention claimed is:

1. A method of driving a mobile communication terminal in a cellular network, said method comprising:
    monitoring reception power levels between the mobile communication terminal and a number of base stations of the cellular network by a control unit of the mobile communication terminal at a predefined reception power level monitoring rate for each base station,
    intermittently monitoring timing information values for a number of base stations by the control unit,
    monitoring a drift of the timing information values for at least two of the base stations and a significant motion of the mobile communication terminal is deemed detected if at least one of the timing information values indicates a drift equal to or exceeding a given timing drift threshold, and
    reducing the predefined reception power level monitoring rate to a reduced reception power level monitoring rate for at least a number of the base stations as long as the motion of the mobile communication terminal is not a significant motion,
    wherein the monitored reception power levels are reported by the mobile communication device to the respective base stations at the desired reception power level monitoring rate and, if the reception power levels are monitored at the reduced reception power level monitoring rate, a previously measured reception power level is reported to the base station until a Previously presented reception power level has been measured, and
    wherein the significant motion of the mobile communication terminal is determined by either the monitored reception power levels or the drift of the timing information.

2. The method according to claim 1, wherein a drift of reception power levels for at least a number of the base stations is also monitored and a significant motion of the mobile communication terminal is deemed detected if at least one of the reception power levels shows a drift equal to or exceeding a given power drift threshold.

3. The method according to claim 1 wherein the timing information values comprise a timing offset indication.

4. The method according to claim 1 wherein only the reception power level monitoring rates for base stations of adjacent cells are reduced to a reduced reception power level monitoring.

5. A computer program product directly loadable into the memory of a programmable control unit of a mobile station, comprising software code portions for performing the steps of a method according to claim 1 when said product is run on the programmable control unit.

6. A control unit for use in a mobile communication terminal for use in a cellular network, comprising:
    a reception power monitoring unit for monitoring reception power levels between the mobile communication terminal and a number of base stations of the cellular network at a predefined reception power level monitoring rate for each base stations, and
    a timing information monitoring unit for intermittently monitoring timing information values for a number of base stations of the cellular network,
    wherein the control unit is operative to monitor a drift of the timing information values for at least two of the base stations and to detect a significant motion of the mobile communication terminal if at least one of the timing information values indicates a drift equal to or exceeding a given timing drift threshold, and the predefined reception power level monitoring rate is reduced to a reduced reception power level monitoring rate for at least a number of the base stations, as long as the motion of the mobile communication terminal is deemed not significant,
    wherein the monitored reception power levels are reported by the mobile communication device to the respective base stations at the desired reception power level monitoring rate and, if the reception power levels are monitored at the reduced reception power level monitoring rate, a previously measured reception power level is reported to the base station until a Previously presented reception power level has been measured, and wherein the significant motion of the mobile communication terminal is determined by either the monitored reception power levels or the drift of the timing information.

7. A mobile communication terminal for use in a cellular network with an antenna, a reception unit coupled to this antenna, a transmitter unit coupled to this antenna and a control unit according to claim 6.

8. A method of driving a mobile communication terminal in a cellular network, said method comprising:

monitoring reception power levels between the mobile communication terminal and a number of base stations of the cellular network by a control unit of the mobile communication terminal at a predefined reception power level monitoring rate for each base station, intermittently monitoring timing information values for a number of base stations by the control unit, monitoring a drift of the timing information values for at least two of the base stations and a significant motion of the mobile communication terminal is deemed detected if at least one of the timing information values indicates a drift equal to or exceeding a given timing drift threshold, and reducing the predefined reception power level monitoring rate to a reduced reception power level monitoring rate for at least a number of the base stations as long as the motion of the mobile communication terminal is not a significant motion, wherein the measured timing information values and the measured reception power levels are first filtered, and wherein the significant motion of the mobile communication terminal is determined by either the monitored reception power levels or the drift of the timing information.

9. The method according to claim 8, wherein a drift of reception power levels for at least a number of the base stations is also monitored and a significant motion of the mobile communication terminal is deemed detected if at least one of the reception power levels shows a drift equal to or exceeding a given power drift threshold.

10. The method according to claim 8 wherein the monitored reception power levels are reported by the mobile communication device to the respective base stations at the desired reception power level monitoring rate and, if the reception power levels are monitored at the reduced reception power level monitoring rate, a previously measured reception power level is reported to the base station until a Previously presented reception power level has been measured.

11. The method according to claim 8 wherein the timing information values comprise a timing offset indication.

12. The method according to claim 8 wherein only the reception power level monitoring rates for base stations of adjacent cells are reduced to a reduced reception power level monitoring.

13. The method according to claim 8 wherein the first filtering comprises calculating a floating mean.

14. A computer program product directly loadable into the memory of a programmable control unit of a mobile station, comprising software code portions for performing the steps of a method according to claim 8 when said product is run on the programmable control unit.

15. A control unit for use in a mobile communication terminal for use in a cellular network, comprising:

a reception power monitoring unit for monitoring reception power levels between the mobile communication terminal and a number of base stations of the cellular network at a predefined reception power level monitoring rate for each base stations, and a timing information monitoring unit for intermittently monitoring timing information values for a number of base stations of the cellular network, wherein the control unit is operative to monitor a drift of the timing information values for at least two of the base stations and to detect a significant motion of the mobile communication terminal if at least one of the timing information values indicates a drift equal to or exceeding a given timing drift threshold, and the predefined reception power level monitoring rate is reduced to a reduced reception power level monitoring rate for at least a number of the base stations, as long as the motion of the mobile communication terminal is deemed not significant, wherein the measured timing information values and the measured reception power levels are first filtered, and wherein the significant motion of the mobile communication terminal is determined by either the monitored reception power levels or the drift of the timing information.

16. A mobile communication terminal for use in a cellular network with an antenna, a reception unit coupled to this antenna, a transmitter unit coupled to this antenna and a control unit according to claim 15.

17. The control unit according to claim 15 wherein the first filtering comprises calculating a floating mean.

* * * * *